(12) United States Patent
Thomson

(10) Patent No.: US 6,901,968 B2
(45) Date of Patent: Jun. 7, 2005

(54) FLUID CONDUIT

(75) Inventor: Fraser Hynd Thomson, Tayside (GB)

(73) Assignee: Oceaneering International Services, London (GB)

( * ) Notice: Subject to any disclaimer, the term of this patent is extended or adjusted under 35 U.S.C. 154(b) by 0 days.

(21) Appl. No.: 10/324,950

(22) Filed: Dec. 20, 2002

(65) Prior Publication Data

US 2003/0116212 A1 Jun. 26, 2003

(30) Foreign Application Priority Data

Dec. 20, 2001 (GB) .............................................. 0130625

(51) Int. Cl.[7] .............................................. F16L 11/00
(52) U.S. Cl. ........................ 138/116; 138/127; 138/138; 138/143; 138/146; 428/36.91
(58) Field of Search ................. 138/127, 116, 138/146, 138, 143; 428/36.91

(56) References Cited

U.S. PATENT DOCUMENTS

| 4,322,574 A | * | 3/1982 | Bow et al. .................. 174/107 |
| 4,385,645 A | * | 5/1983 | Campbell et al. ........... 138/139 |
| 4,510,974 A | * | 4/1985 | Natori et al. ............... 138/137 |
| 4,570,680 A | | 2/1986 | Ratti |
| 5,271,977 A | | 12/1993 | Yoshikawa et al. |
| 5,476,121 A | * | 12/1995 | Yoshikawa et al. ......... 138/138 |
| 5,930,431 A | * | 7/1999 | Lail et al. ................... 385/100 |
| 6,213,156 B1 | * | 4/2001 | Niki et al. .................. 138/126 |
| 6,237,641 B1 | * | 5/2001 | Niki et al. .................. 138/126 |
| 6,328,075 B1 | * | 12/2001 | Furuta et al. ............... 138/143 |
| 6,631,743 B2 | * | 10/2003 | Enders et al. ............... 138/138 |
| 2002/0056481 A1 | | 5/2002 | Nakakita et al. |
| 2002/0185188 A1 | * | 12/2002 | Quigley et al. ............. 138/137 |
| 2003/0066568 A1 | * | 4/2003 | Hibino et al. ............... 138/121 |

FOREIGN PATENT DOCUMENTS

| EP | 1020673 | 7/2000 |
| GB | 699543 | 11/1953 |
| GB | 838070 | 6/1960 |
| GB | 2245678 | 1/1992 |
| JP | 2000002375 | 1/2000 |

* cited by examiner

Primary Examiner—James Hook
(74) Attorney, Agent, or Firm—Young & Basile, P.C.

(57) ABSTRACT

The present invention relates to a fluid conduit, and to a multi-conduit umbilical for use in the transportation of chemicals with small molecular size and shape e.g. methanol ethanol and other hydrocarbon fluids used in the oil industry. The conduit comprises a flexible fluid hose encapsulated by at least one metallized layer which is formed and arranged to minimize permeation of a fluid being transported in the fluid hose. In use in a multi-conduit umbilical the metallised layer minimizes permeation into adjacent fluid hoses containing chemicals. The invention is characterized in that the fluid hose(s) have differing levels of encapsulation and thereby permeation, along a given length according to the operational requirements of the fluid conduit/umbilical. Typically such fluid conduits/umbilicals will have lengths in excess of 100 km.

14 Claims, 2 Drawing Sheets

FLUID CONDUIT

FIELD OF THE INVENTION

The present invention relates to a conduit for transporting fluids, particularly chemicals with small molecular size, eg, methanol, ethanol and hydrocarbon fluids, and particularly to a multi-conduit umbilical for the transportation of such fluids over very long lengths, typically in excess of 50 km.

BACKGROUND OF THE INVENTION

In off-shore drilling environments, it is necessary to supply chemicals such as methanol or glycol to the wellhead and this is achieved using flexible hoses or multi-conduit hoses, sometimes referred to as umbilicals. Such umbilicals may be from 50 m in length to well in excess of 100 km in length in use in the field. In a multi-conduit hose or umbilical, each of the flexible hoses therein may be used for transporting different types of chemical, eg, one for transporting methanol and one for glycol and others for transporting other hydro-carbon gases. Additionally, in an umbilical there may be other lines such as hydraulic control lines, injection lines and/or service lines, eg, electrical conductors and fibre optic cabling. The present invention relates also to so called "High Collapse Resistant Hoses" of the type used in deep sea applications, which, in use, must be able to resist collapsing due to the very large pressures exerted thereon.

United Kingdom Patent Publication No. GB2245678A discloses an umbilical for use in the transportation of the aforesaid chemicals, eg, methanol and glycol. A particular disadvantage that has been identified with hoses generally and in particular the umbilical, and hoses, disclosed in the aforesaid publication is that they are permeable, to a greater or lesser extent, to chemicals with small molecular sizes/molecular shapes, as those found in methanol, ethanol and other hydro-carbon gases. Nylon material has been used for many years in conduits and Nylon 11 in particular has good physical stability except that it has poor permeation characteristics. Over long lengths, typically several kilometres, GB2245678A utilises materials which have slightly improved permeation characteristics but such an arrangement is not wholly acceptable to the offshore industry from an emissions perspective and lack the physical stability of materials such as Nylon 11. Furthermore it will be appreciated that over very long lengths material costs are a significant factor to be considered.

Additionally, it has been found that it is possible for there to be cross contamination between adjacent hoses within an umbilical wherein chemicals transported through one hose permeate out of that hose into an adjacent hose which may contain a different chemical.

Conduits and umbilicals for the transportation of various fluids are described variously in EP 1020673, JP 2000-002375, U.S. Pat. No. 4,570,680, GB 838070 & GB 699543.

Another issue in conduits/umbilicals of a one piece construction and very long length, typically in excess of 100 km, is that permeation is acceptable, where the conduit/umbilical is, for example, under water, but permeation is to be avoided where the umbilical surfaces, top side, or when the conduit/umbilical passes across ground because of the hazardous/flammable nature of some permeable fluids. Umbilicals having a plurality of different fluid conduits having differing permeation characteristics along a given length have not previously been proposed.

Moreover hoses for umbilicals are generally produced in very long lengths e.g. 100 km or more and are required to have a combination of features to make them suitable for subsea use e.g. high temperature resistance, high chemical resistance and low permeation rates. Some flouropolymers are particularly suitable for this application but production of conduits in the aforesaid extremely long lengths is not possible due to oligomer and low molecular species building up on extrusion tools and damaging the liner/conduit after a short while.

It is an object of the present invention to avoid or minimise one or more of the aforesaid problems.

SUMMARY OF THE INVENTION

The present invention provides a fluid conduit for the transportation of chemicals with small molecular size and shape, eg, methanol, ethanol and hydrocarbon fluids and which is suitable for use in a multi-conduit umbilical, which conduit comprises a generally flexible fluid hose encapsulated by at least one metallised layer formed and arranged to substantially minimise permeation therethrough of fluid being transported in said fluid hose and, in use, in a multi-conduit umbilical to substantially minimise permeation into said fluid hose from adjacent hoses containing chemicals characterised in that sections or lengths of said fluid hose have differing levels of encapsulation, and thereby permeation, along a given length thereof according to the operational requirement of the fluid conduit or umbilical.

The present invention also provides a multi-conduit umbilical comprising a plurality of the aforesaid fluid conduits, according to a first aspect of the invention, bundled together and provided with at least one of a hose reinforcement structure surrounding said bundle of fluid conduits and an outer sheath.

Thus, with a fluid conduit and/or multi-conduit umbilical, according to either aspect of the present invention, the problems of permeation of fluid contained therein at critical position(s) along a length of conduit/umbilical is significantly minimized.

Preferably said flexible fluid hose is in the form of a thermoplastic hose, for example a polyethylene, a cross-linked polyethylene or a polyamide such as Nylon 11 (Trade Mark). Preferably said fluid hose has a wall thickness which lies in the range of from 0.5 to 10 mm and more preferably in the range 1.5 mm to 2.5 mm for hose bore diameter of 25.4 mm. Examples of fluid hose suitable for use in the applications described herein above will be known to those generally skilled in the art. The invention does allow for the use of lower cost hose liner materials to be used than previously as such hoses generally have higher inherent permeation rates.

Where the fluid to be transported is particularly corrosive or is exposed to high temperatures, then there may be used a chemical and temperature resistant polymer such as a fluoropolymer. The invention permits the use of hose materials that have very high temperature rating and very high generic chemical resistance but typically have poor permeation performance e.g. the aforesaid flouropolymers. Such materials have been discounted in the past because of such poor permeation performance. In particular it will be noted that permeation rates increase with ascending temperatures and as such fluid hoses and umbilicals are generally placed on the sea bed (where the temperature is relatively constant 4° C.), significant advantages can be realised.

Such an arrangement makes the present invention particularly suitable for use in replacing existing designs wherein are used substantially metallic tubes instead of the aforesaid thermoplastic hoses. Whilst substantially metallic tubes provide extremely low levels of permeation, they tend to be expensive, heavy and difficult to handle and manipulate. Additionally metallic tubes are less robust, subject to fatigue, more fragile and have a generally lower reliability record than thermoplastic hoses.

Preferably said metallised layer comprises at least one layer of metal. Said metals may be selected from the group including copper, nickel, chrome, aluminium and alloys thereof. Preferably said metals are suitable for use in long term, sub-sea applications and are compatible with the material of the fluid hose which they are encapsulating and the materials of other features of the umbilical.

Preferably said metallised layer or layers may be applied to the fluid hose by any suitable means including electroplating or spraying of metallised material onto the outer surface of the fluid hose. Preferably said metallised layer has a thickness in the range of 2 microns to 2 mm, depending on the particular applications/hose diameter. Preferably said fluid hose is formed by a continuous extrusion process and around which the metallised layer is applied directly, so as to be received by the nascent cross linked polyethylene, polyethylene or polyamide surface or fluoropolymer surface. Where there is used an electroplating or spraying process, there may be applied several layers of said metallised material and indeed there may be used different metals for each different layer so as to give the fluid conduit the required impermeability/fluid handling characteristics required.

Alternatively, said metallised layer may comprise a film or tape applied over the outer surface of the fluid hose. Desirably said metallised layer in a film or other form provides at least 90% coverage around the hose. Preferably said metallised tape or film is made from one of the metals referred to above. Said tape may be provided with a means for bonding said tape to the outer surface of said fluid hose. Means of bonding may include an adhesive or a chemical bond or simply the physical wrapping of a tape helically around the hose with or without a significant degree of overlap, eg, 400% coverage. The metallic layer may or may not have a backing film such that it can either have a further coating or no coating or be coated with an extruded polymer or hose reinforcement structure to facilitate protection of the metallised layer. Alternatively, there may be provided a taped polymeric layer which may be bonded (chemical, adhesive or otherwise) to the metallised tape layer or film.

Said encapsulation of the fluid hose may be along the full length of said hose or at predetermined positions/lengths along a fluid conduit/umbilical.

Desirably said metallised layer can be used as a means of leak, failure or hose break detection. For example where a fluid hose fails, for example by hydraulic jetting, this may cause the metallised layer to loose its continuity. Layer continuity can be measured using known testing techniques such as time Time Domain Reflectometry or Murray Loop testing. Advantageously this provides a means of quickly and easily detecting a fault along a long length of umbilical.

Desirably said metallised layer may be used as a heating means for the hose/umbilical by passing an electrical current through the metallised layer in order to prevent (or reduce) temperature reduction in an umbilical. This feature is particularly desirable as temperature reduction increases fluid flow viscosity and thereby reduces flow efficiency.

A further advantage of the metallised layer is that together with a low voltage DC supply a basic signalling facility can be provided between, for example, a platform to platform or from subsea to platform.

Furthermore the metallised layer provides a means of testing for conductive contamination in the liner by performing insulation resistance checks between the metallised layer and the hose bore filled with a conductive fluid. Such testing can be used to confirm the quality of the fluid conduit during manufacture.

The invention also enhances and extends the design life of a liner by substantially eliminating liner contact with sea water thereby preventing the action of hydrolysis and surface chemical attack.

Desirably on low pressure hoses/conduits, where the metallised layer is in the form of a helical wrap tape, such a design can substantially enhance hose burst performance.

Preferably, the fluid conduit is provided with a hose reinforcement structure comprising spiralled or braided fibre reinforcement filaments. Again, such reinforcement techniques will be known to those skilled in the art. Alternatively, there may be bonded or extruded on to said metallised layer, prior to applying a hose reinforcement structure, an extruded or wrapped bonding tie layer so as to retain said metallised layer in substantially close contact with the outer wall surface of the fluid hose thereby to substantially prevent permeation.

Desirably there may be provided an outer jacket or sheath extruded around or wrapped there around in a helical fashion, so as to facilitate handling of said fluid conduit according to the invention.

Where the present invention relates to a multi-conduit umbilical, there may be included in said umbilical conductors such as electrical cables or optical fibre cables. Again, the structure and composition of such multi-conduit umbilicals will be known to those skilled in the art.

Further preferred features and advantages of the present invention will appear from the following detailed description, given by way of example of some preferred embodiments illustrated with reference to the accompanying drawings in which:-

DESCRIPTION OF THE PREFERRED EMBODIMENT

Figure 1:
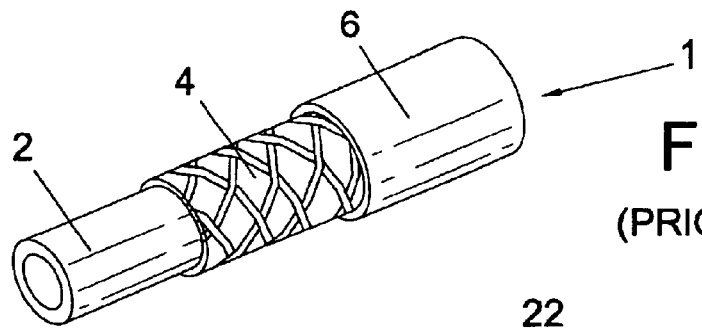
FIG. 1 is a perspective view of a typical thermoplastic hose of the type known in the prior art.

The prior art of FIG. 1 shows a perspective view of a typical thermoplastic hose, indicated by reference number 1, which comprises a hose liner 2 surrounded by a braided fibre reinforcement structure 4, which structure is surrounded by an extruded outer jacket or sleeve 6.

Figure 2:
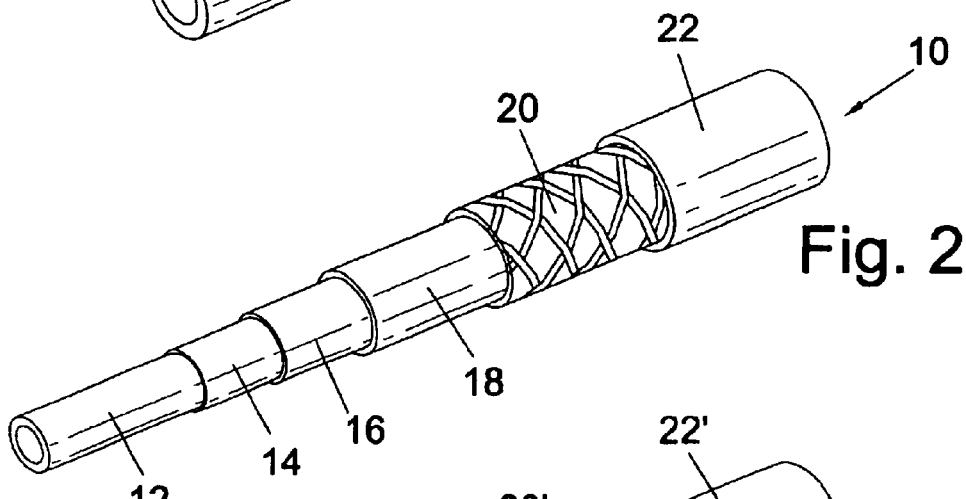
FIG. 2 is a perspective view of a first embodiment of a fluid conduit according to the invention.

A fluid conduit according to the present invention is shown in FIG. 2, and is indicated by reference number 10. The fluid conduit 10 is formed and arranged for the transportation of chemicals with a small molecular size and shape, for example, methanol, ethanol and hydrocarbon gases and is suitable for use as a single line hose and in a multi-conduit umbilical (not shown). The conduit 10 comprises a generally flexible fluid hose liner 12 encapsulated by a layer of electro-plated metal 14. The electro-plated layer comprises a film having a thickness of nominally 12 microns of metal which is applied to the full length of the fluid hose 12 (or to specific areas where very low permeation is essential, such as found topside in offshore applications). On top of the electro-plated layer 14, there is applied an extruded bonding layer 16 which ties the electro-plated layer 14 to the fluid hose 12. This is an optional layer. On top of this there is a taped or extruded polymer outer liner layer 18 (again an option) which is designed to prevent damage to the metallised layer from adjacent layers, particularly braided layers. On top of these layers is a braided fibre reinforcement 20 of a criss-cross arrangement of the type commonly used in such braided hoses. An outer jacket or sheath 22 is extruded over the braided fibre reinforcement 20 to facilitate handling of the conduit.

Figure 3:
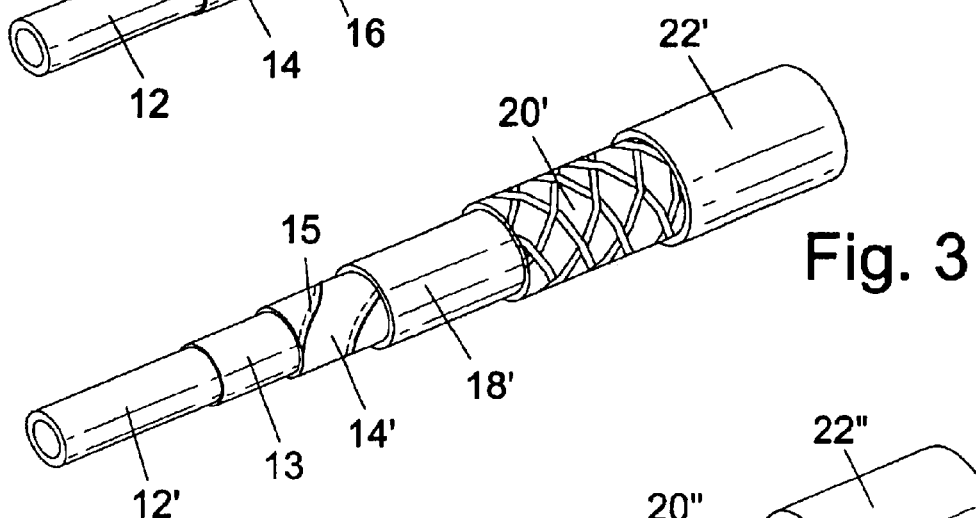
FIG. 3 is a perspective view of a second embodiment of a fluid conduit.

FIG. 3 shows an alternative embodiment generally similar to that described above, with reference to FIG. 2, and which is described with similar reference numerals with a suffix ' attached. Again, there is provided a fluid hose 12' around which is extruded, or otherwise applied, an adhesive bonding tie layer 13 to which a metallic tape/film layer 14' can be secured. The metallic film 14' is applied on top of the extruded adhesive bonding layer 13' and is spiralled around the hose 12', and which overlaps 15 itself as it is applied (overlapping is not essential for all embodiments). The metallic tape/film layer 14' may be provided with an optional polymer backing (not shown). On top of the metallic tape/film layer 14' there is a taped or extruded polymer outer lining layer 18' and on top of this there is a braided fibre reinforcement 20'. Again an extruded outer jacket or sheath 22' is provided for to provide protection for handling purposes by mechanical apparatus/machinery.

Figure 4:
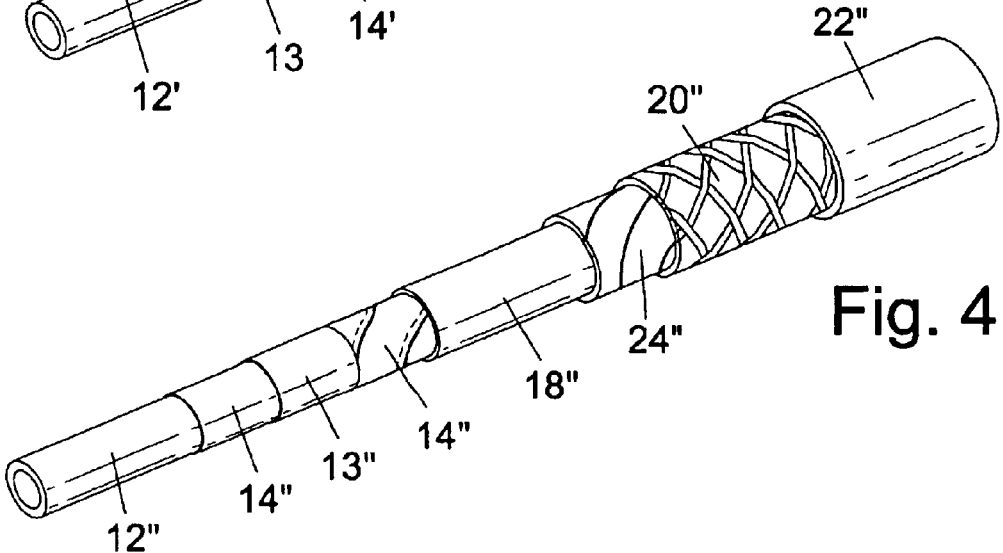
FIG. 4 is a perspective view of a third embodiment of a fluid conduit.

FIG. 4 shows yet a further embodiment described with like reference numbers to those used above with a second suffix " attached. A fluid hose 12" has an electroplated layer 14" (similar to that described above with reference to Figure number 2) and has on top thereof an extruded adhesive/chemical bonding tie layer 13" to which may be bonded a metallic tape or film layer 14" (again similar to that described above with reference to FIG. 3). The metallic tape film layer 14" is provided with an optional polymer backing layer (not shown) to which may be affixed a taped or extruded polymer outer lining layer 18". A second metallic tape/film layer 24" with an optional polymer backing layer is secured spirally to the outer liner layer and is surrounded by a braided fibre reinforcement layer 20". An extruded outer jacket or sheath 22' is also provided. This arrangement provides a double skin of metallic layers around the fluid hose, thereby to substantially minimise/eliminate permeation therethrough/thereinto.

Figure 5:
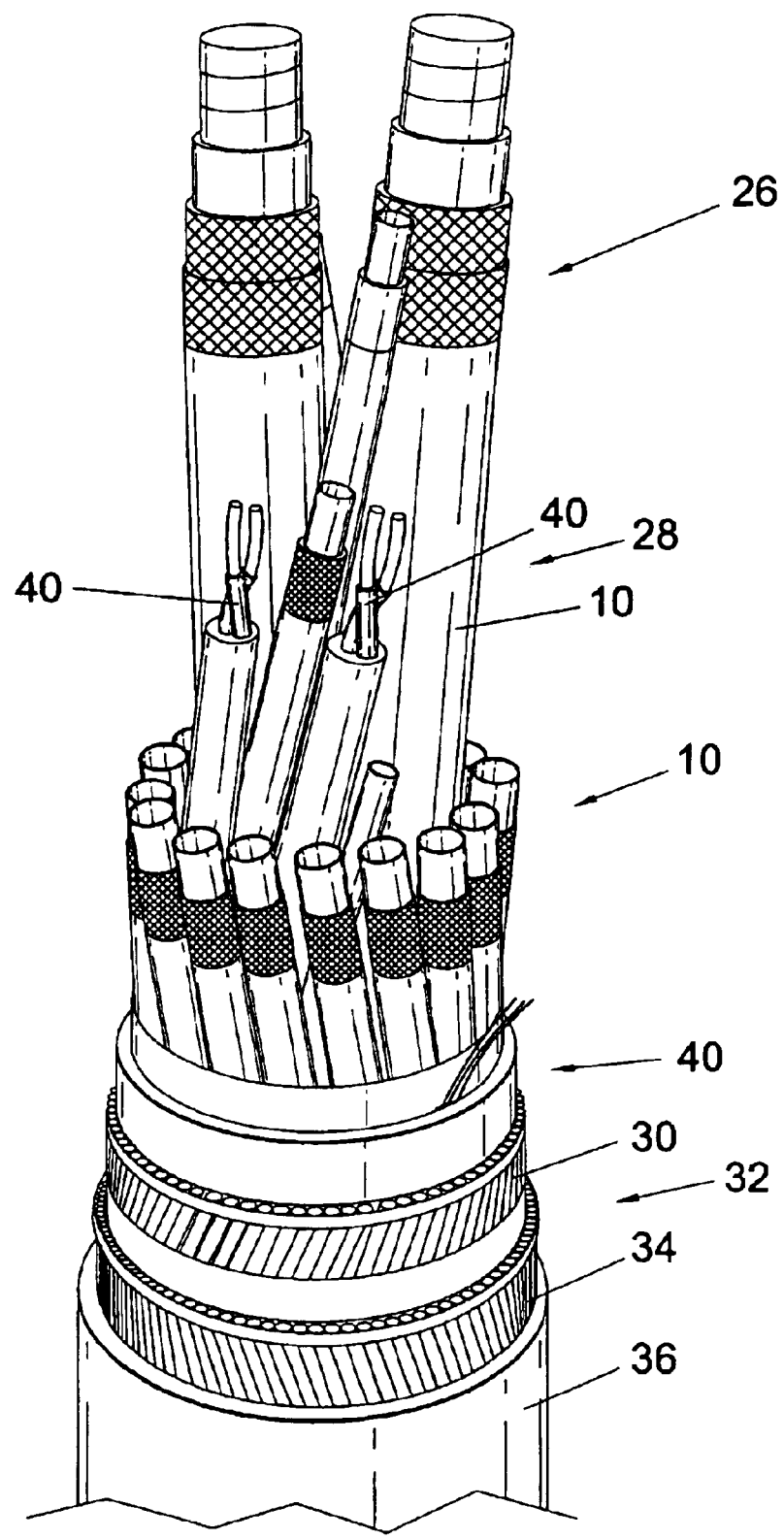
FIG. 5 is a view of a multi-conduit umbilical according to the invention.

FIG. 5 shows a view of a multi-conduit umbilical indicated by reference number 26 (according to the invention), which umbilical 26 comprises a plurality of individual fluid conduits 10, the conduits being according to the other aspect of the invention described above with reference to FIGS. 2 to 4. The fluid conduits 10 are bundled 28 together and each of the individual fluid conduits will have different characteristics. In the example shown there are conduits for transporting ethanol, conduits for transporting wax inhibitors, corrosion inhibitors, scale inhibitors, hydrate inhibitors, hydraulic control fluid, all of which are bundled together and provided with hose reinforcement structure 30 comprising a multiplicity of metal wires 32 arranged helically around the bundle 28. A second layer of helically wound metal wires 34 (wound in the opposite direction) provides resistance to crushing/kinking. An outer layer of plastics material 36 sheaths the whole of the umbilical 26.

In addition to the various conduits described there is included power cabling 38 and fibre optic cabling 40 for communication purposes.

Various modifications may be made to the above described embodiments without departing from the scope of the present invention and thus for example, instead of using an electro-plated layer and a metallic tape/film layer, there may be used several metallic tape/film layers spaced apart by the extruded polymer layers/taped polymer layers or combinations thereof.

What is claimed is:

1. A variably permeable conduit for the long distance conveyance of fluids comprising:
   a flexible plastic hose of multiple kilometer length;
   a metallized encapsulating layer disposed over the outside surface of said hose wherein the metal of said metallized layer is selected from the group consisting of copper, nickel, chrome, aluminum and alloys thereof and is of a thickness between about 2 microns and 2 millimeters and is applied by a step selected from the group consisting of spraying, depositing, plating and wrapping; and
   said metallized layer exhibiting long length variations in effective permeability to the molecules of said fluid whereby at least one substantial and continuous length of said hose has different permeability to said fluid molecules than other substantial and continuous lengths.

2. A fluid conduit according to claim 1 wherein said metallized layer (or layers) is applied to the fluid hose in the form of a metallized tape.

3. A fluid conduit according to claim 1 wherein said fluid hose material is selected from the group of materials including polyethylene, cross-linked polyethylene, polyamide or fluoropolymers.

4. A fluid conduit according to claim 1 wherein said fluid hose is a unitary single hose formed by a continuous extrusion process.

5. A fluid conduit according to claim 1 wherein said fluid hose is a one piece extrusion having a length in excess of 50 km.

6. A fluid conduit according to claim 1 wherein said fluid hose is a one piece extrusion having a length in excess of 100 km.

7. A fluid conduit according to claim 1 wherein the metallized layer is formed by electroplating.

8. A fluid conduit according to claim 1 wherein the metallized layer is applied by spraying.

9. The conduit of claim 1 further including a diagonally braided reinforcing layer over said encapsulating layer.

10. A variably permeable multi-conduit umbilical for the long distance conveyance of fluids in offshore drilling application comprising:
    a plurality of flexible plastic hoses of multi-kilometer length and gathered together to form a bundle;
    at least one of said plastic hoses further having a metallized encapsulating layer disposed over said hose wherein the metal of said metallized layer is selected from the group consisting of copper, nickel, chrome, aluminum and alloys and is applied by a step selected from the group consisting of fraying, depositing, plating and wrapping, each said metallizing layer exhibiting a variation in effective permeability to the molecules of said fluid whereby at least one substantial and continuous length of said bundle has a different permeability to said hydrocarbon fluid molecules than other substantial and continuous bundle lengths.

11. A multi-conduit umbilical according to claim 10 which includes at least one of a power cable; fiber optics cable, and other fluid transportation hoses.

12. A multi-conduit umbilical according to claim 10 having a length in excess of 50 km.

13. A multi-conduit umbilical according to claim 10 having a length in excess of 100 km.

14. An umbilical as defined in claim 10 further including a reinforcing layer over said bundle and a plastic sheath over said reinforcing layer.

* * * * *